(12) United States Patent
Martin, III et al.

(10) Patent No.: US 7,866,433 B2
(45) Date of Patent: Jan. 11, 2011

(54) CARRIER ASSEMBLY

(75) Inventors: Robert J. Martin, III, Newark, OH (US); Dale J. Eschenburg, Rochester Hills, MI (US); Brian David Hayes, Newark, OH (US)

(73) Assignee: ArvinMeritor Technology, LLC, Troy, MI (US)

( * ) Notice: Subject to any disclaimer, the term of this patent is extended or adjusted under 35 U.S.C. 154(b) by 631 days.

(21) Appl. No.: 11/782,728

(22) Filed: Jul. 25, 2007

(65) Prior Publication Data

US 2009/0029821 A1 Jan. 29, 2009

(51) Int. Cl.
 *B60K 17/00* (2006.01)
(52) U.S. Cl. ............... 180/337; 180/344; 180/346; 180/354; 180/374
(58) Field of Classification Search .............. 180/337, 180/344, 346, 348, 354, 360, 374, 375, 378
See application file for complete search history.

(56) References Cited

U.S. PATENT DOCUMENTS

| | | | |
|---|---|---|---|
| 6,533,060 B1 * | 3/2003 | Seto ........................ 180/337 |
| 7,047,839 B2 * | 5/2006 | Ishii et al. ................. 74/606 R |
| 7,296,644 B2 * | 11/2007 | Teraoka ................... 180/65.25 |
| 7,637,346 B2 * | 12/2009 | Abend et al. ................ 180/374 |
| 2003/0057009 A1 * | 3/2003 | Abend et al. ................ 180/375 |
| 2003/0150664 A1 * | 8/2003 | Woods et al. ............... 180/348 |
| 2003/0188913 A1 * | 10/2003 | Ishimaru et al. ............. 180/337 |

* cited by examiner

*Primary Examiner*—Toan C To
(74) *Attorney, Agent, or Firm*—Carlson, Gaskey & Olds, PC (57) ABSTRACT

A carrier assembly has a unique architecture which allows the carrier assembly to be defined by a very small packaging envelope. The carrier includes a main carrier housing with an internal cavity for receiving a differential and a carrier cover that closes the internal cavity once the differential has been installed. Examples of architectural features include a differential lock actuator that is mounted to the carrier cover, dowel pins that accommodate differential leg thrust loads and align the carrier cover relative to the main carrier housing, and bolt-in differential leg structures to facilitate pinion installation. Further, the carrier assembly can be utilized with an independent suspension to provide a increased jounce travel range.

24 Claims, 7 Drawing Sheets

CARRIER ASSEMBLY

TECHNICAL FIELD

A carrier assembly is defined by a very small packaging envelope, which allows the carrier assembly to be utilized with a suspension system to provide desired suspension characteristics.

BACKGROUND OF THE INVENTION

Carriers are utilized in many different axle and suspension configurations. A carrier includes a pinion gear that receives driving input from a power source such as an engine or electric motor. The pinion gear drives a ring gear, which is coupled to a differential. The differential allows speed differentiation between two different driving outputs. The driving outputs are configured to drive laterally spaced vehicle wheels.

The carrier includes a carrier housing that houses and protects the pinion gear, ring gear, and differential within an internal cavity. The carrier can be utilized with different types of axles and suspensions. For example, the carrier can be utilized in a rigid axle configuration with leaf or air spring suspensions where the carrier housing is formed as part of a rigid axle housing that extends between the laterally spaced vehicle wheels. In this configuration the carrier housing comprises an open bowl portion centrally formed within the rigid axle housing that receives carrier gear components, and which is enclosed by a cover portion.

The carrier can also be utilized as part of an axle that is configured to be mounted to a vehicle with an independent suspension. In this type of configuration, the carrier is mounted to a sub-frame unit that is positioned between laterally spaced wheel ends. The sub-frame unit is attached to a vehicle frame or chassis. Upper and lower control arms connect each wheel end to the sub-frame unit such that each wheel end can move independently from the other wheel end within a wheel jounce travel range.

Certain vehicle applications require large amounts of wheel jounce travel. Wheel jounce is defined as vertical movement of a wheel or axle relative to a vehicle reference frame. Jounce is considered positive for compressive movement, i.e. movement of the wheel upward relative to a vehicle body. In order to accommodate a large amount of wheel jounce travel, the length of the upper and lower control arms needs to be increased. However, the wheel ends often cannot simply be spaced further apart from each other to accommodate this increased control arm length. This is because there are maximum overall axle width requirements that cannot be exceeded if the vehicle is to travel on city streets and highways. Thus, the packaging space taken up by the carrier becomes critical to maintaining maximum axle width in combination with increased wheel jounce travel ranges.

Traditional carrier construction makes it very difficult to provide a narrow width carrier that could be used with an independent suspension as described above. If high reduction ratios are required for a vehicle application, the ring gear must be appropriately sized to provide the desired power transmission. In some applications, the ring gear must have a diameter that is greater than 11 inches. Further, in traditional carrier configurations, carrier components can only be located in certain positions within the carrier housing such that other components can be assembled into the carrier housing.

Specifically, the differential includes a plain case half supported by a plain side bearing and a flange case half supported by a flange side bearing. The plain side bearing cannot be located inboard of a maximum outer diameter of a head of the pinion gear because the pinion gear would not be able to assemble into the carrier.

Thus, there is a need for a new carrier system architecture that allows the overall width of a carrier to be reduced compared to traditional carrier configurations, but still provides desired power transmission and suspension characteristics.

SUMMARY OF THE INVENTION

A carrier assembly includes unique system architecture with different carrier features that allow the carrier assembly to be defined by a very small packaging envelope.

In one example, the carrier assembly includes a first output to drive a first wheel end, a second output to drive a second wheel end, and a differential gear assembly that allows speed differentiation between the first and second outputs. A main carrier housing includes an opening into an internal cavity that receives the differential gear assembly such that the main carrier housing substantially surrounds the differential gear assembly. A carrier cover is attachable to the main carrier housing to cover the opening and the differential gear assembly within the main carrier housing. A differential lock actuator is located on the carrier cover to selectively lock the first and second outputs to rotate at a common speed.

In one disclosed example, the differential lock actuator includes an actuator housing that is integrally formed with the carrier cover as a single piece component. Further, a structural cross-beam member that secures the carrier assembly to a suspension sub-frame can also be integrally formed with the main carrier housing as a single piece component. Locating the differential lock actuator on the carrier cover provides a more compact assembly compared to traditional configurations.

Another example of a unique carrier feature comprises a bolt-in differential leg structure. The carrier assembly includes an input pinion gear, a ring gear driven by the input pinion gear, and a differential that has a flange half differential case, a plain half differential case, and a differential gear assembly supported by the flange and plain half differential cases. A carrier housing includes an internal cavity that receives the differential. A differential bearing rotatably supports the differential for rotation relative to the carrier housing about an axis. A leg cap has a bearing portion for supporting the differential bearing and a mounting portion that is securable to the carrier housing with at least one fastener. The leg cap includes a clearance area to allow the input pinion to assemble within the carrier housing without interfering with differential bearings or other carrier components.

Another example of a unique carrier feature is the use of at least one dowel pin to secure the carrier cover to a differential leg structure. The differential includes flange and plain case halves that are supported by a plain and flange side bearing, respectively. A first differential leg structure supports the plain side bearing and a second differential leg structure supports the flange side bearing. In one disclosed example, a first dowel pin secures the carrier cover to the first differential leg and a second dowel pin secures the carrier cover to the second differential leg. The dowel pins serve to precisely locate the carrier cover to the main carrier housing, as well as serving to accommodate thrust loads that would tend to separate the first and second differential legs.

Another example of a unique carrier feature includes a differential that is mounted to the carrier cover prior to being installed within the main carrier housing. In one example, differential leg structures are integrally formed with the carrier cover as one-piece, which allows the differential to be easily mounted to the carrier cover to form a sub-assembly. The sub-assembly is then inserted into an internal cavity in the main carrier housing with the carrier cover closing off the internal cavity.

A unique method for assembling the carrier is also provided. As discussed above, the carrier is provided with a carrier housing having a rear opening into an internal cavity and a cover for closing the rear opening. A pinion gear is installed through the rear opening and into the internal cavity. Next, a differential and ring gear sub-assembly is installed through the rear opening such that the pinion gear meshes with a ring gear of the differential and ring gear sub-assembly. Next, differential support legs are installed through the rear opening to support the differential and ring gear sub-assembly. Additional steps can include using dowel pins supported by the differential support legs to align the cover relative to the housing, using threaded bearing cups to support differential bearings and to allow for selective adjustment of bearing preloads, and installing a differential lock actuator on the cover prior to assembling the cover to the carrier housing.

The above-described carrier features can be used alone or in various combinations to provide a narrow width carrier configuration. In one disclosed embodiment, the carrier is utilized for an axle and independent suspension combination. In this combination, a drive axle has a first wheel end and a second wheel end that is laterally spaced apart from the first wheel end to define an overall axle width. An independent suspension independently supports the first and second wheel ends to allow independent movement from each other. The carrier has a first output to drive the first wheel and a second output to drive the second wheel end. The outputs comprise cardon joints that couple the carrier to rotating components such as opposing wheel shafts. The carrier is defined by a maximum carrier width that is less than twenty-five percent of the overall axle width. The carrier width is defined as a lateral width that extends between centers of the opposing cardon joints. In one example, overall axle width is less than 100 inches, and the maximum carrier width is less than 20 inches. Further, upper and lower control arms of the independent suspension provide a jounce range of 20 to 24 inches of travel.

In one disclosed example, the carrier is defined by a maximum carrier width that is 500 millimeters or less. This is used in combination with the independent suspension that can provide up to 24 inches of wheel jounce travel. Further, the carrier can be utilized with a ring gear that has a diameter as large as 11.5 inches for example.

These and other features of the present invention can be best understood from the following specification and drawings, the following of which is a brief description.

DETAILED DESCRIPTION OF THE PREFERRED EMBODIMENT

Figure 1:
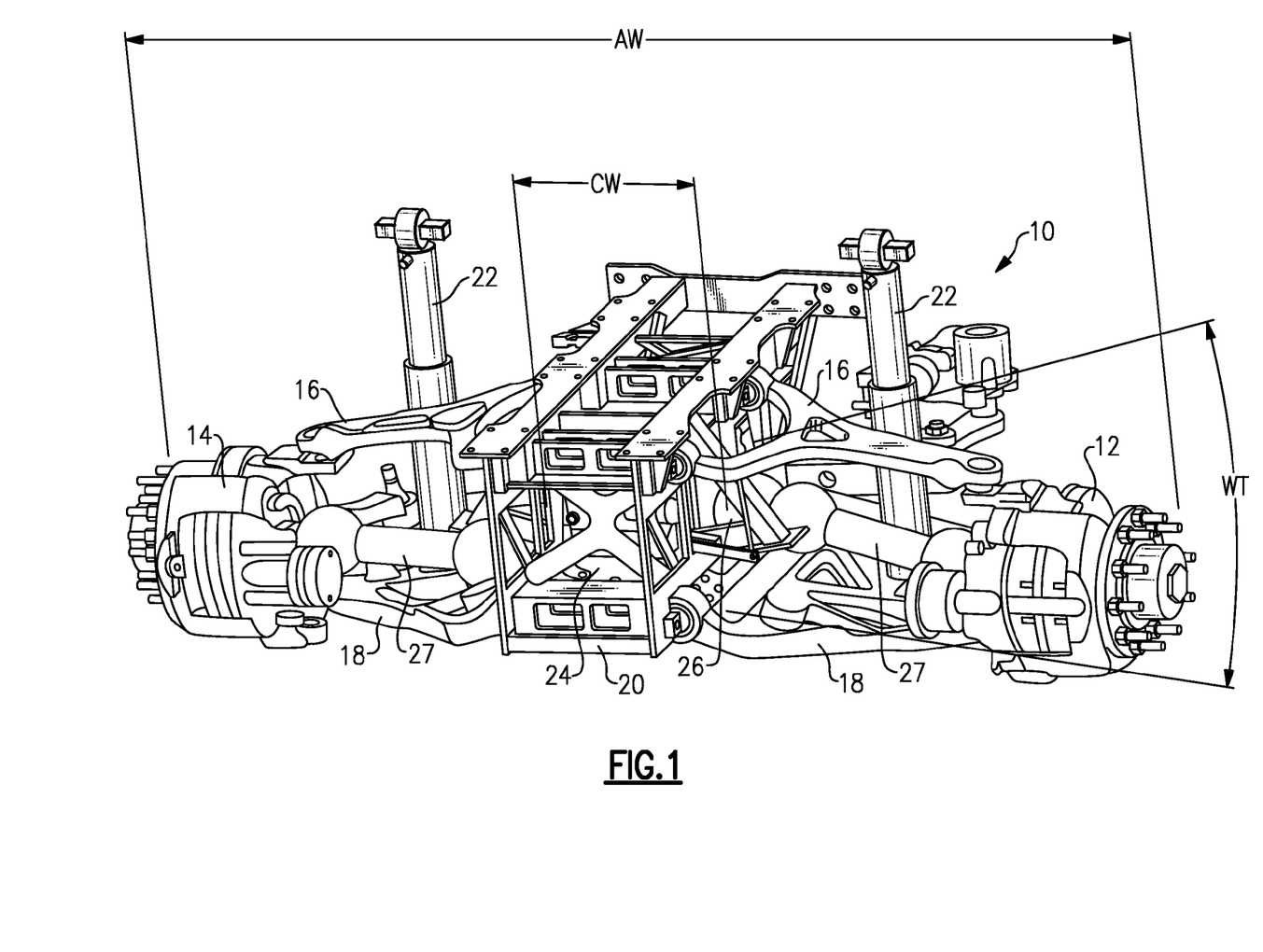
FIG. 1 shows an axle for a vehicle including an independent suspension and carrier incorporating the subject invention.

An independent suspension and axle assembly 10 is shown in FIG. 1. The independent suspension and axle assembly 10 includes first 12 and second 14 wheel end assemblies that are laterally spaced apart from each other. Upper 16 and lower 18 control arms connect each of the first 12 and second 14 wheel end assemblies to a suspension sub-frame 20 such that the first 12 and second 14 wheel end assemblies can move independently from each other in response to suspension load inputs. The suspension sub-frame 20 is attached to a vehicle structure such as a frame or chassis member (not shown). Shock absorbers 22 are installed to react between the lower control arms 18 and the vehicle structure.

A carrier 24 is mounted to the suspension sub-frame 20 and includes a first driving output 26 that drives the first wheel end assembly 12 and a second driving output 28 (see FIG. 3; not shown in FIG. 1 for purposes of clarity) that drives the second wheel end assembly 14. The carrier 24 is uniquely configured to fit within a very narrow packaging envelope. The carrier 24 includes many different unique architectural features that can be used individually, or in various combinations, to provide a carrier with a very narrow width but which still provides a desired power transmission level for the first 26 and second 28 driving outputs. Each of these unique architectural features will be discussed in greater detail below.

As shown in FIG. 1, the independent suspension and axle assembly 10 includes the first wheel end assembly 12 and the second wheel end assembly 14 that are laterally spaced apart from each other to define an overall axle width AW. The overall axle width AW is a lateral width that is defined between opposing ends of the wheel end assemblies 12, 14. The carrier is defined by a maximum carrier width CW. The carrier width is defined as a lateral width extending between opposing cardon joint centers. The subject invention provides a maximum carrier width CW that is less than twenty-five percent of the overall axle width.

In the example shown in FIG. 1, the maximum carrier width is approximately twenty percent or less of the overall axle width. For example, if the overall axle width is 96 inches, the carrier maximum width is less than 20 inches.

Figure 2:
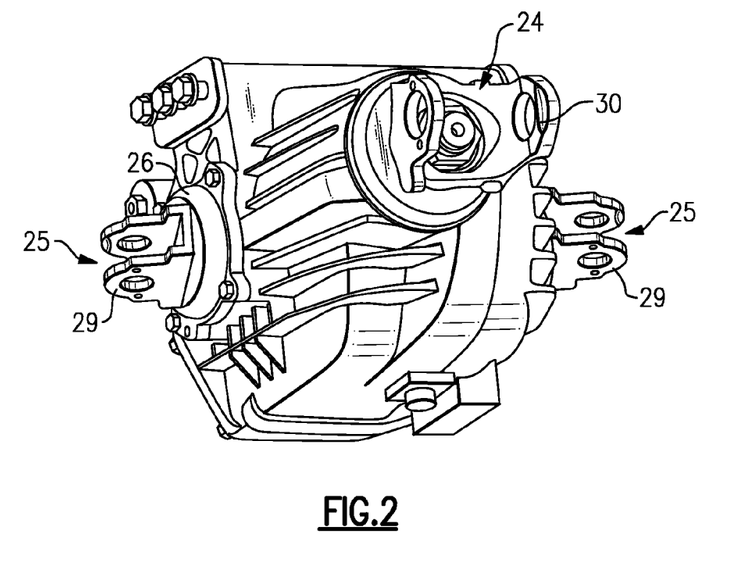
FIG. 2 shows a perspective view of the carrier of FIG. 1.

The carrier 24 is shown in greater detail in FIG. 2. The carrier 24 provides two driving outputs, shown generally at 25, that are coupled to opposing wheel shafts 27 (FIG. 1). Cardon joints are used to couple the outputs from the carrier 24 to the wheel shafts 27. The cardon joints include a pair of yokes that are coupled to each other with a cross-shaped member as known. One yoke (not shown) is supported on the wheel shaft 27 and a mating yoke 29 (FIG. 2) is coupled to a driving out put from the carrier 24. A carrier width CW is defined as a lateral width that extends between centers of the opposing cardon joints.

In the example shown in FIG. 2, the carrier 24 is defined as having a maximum carrier width CW of 500 millimeters (19.685 inches). By limiting the carrier width in such a manner, the length of the upper 16 and lower 18 control arms can be increased without affecting a maximum overall axle width limitation of 96 inches. This provides the benefit of increased wheel jounce travel WT that can be within the range of 20-24 inches.

As discussed above, this narrow width carrier 24 also provides a high power transmission output to drive the first 12 and second 14 wheel end assemblies. As shown in FIG. 2, the carrier 24 receives driving input via an input yoke 30 that is connectable to a driveshaft (not shown) with a cardon joint similar to that discussed above. The input yoke 30 is coupled to a pinion gear 32, shown in FIG. 3, which in turn meshes with a ring gear 34. The pinion gear 32 and ring gear 34 are sized to provide a desired gear reduction ratio. In the example shown, the ring gear 34 has a diameter that can be as large as 11.5 inches. This is significant considering that the overall width of the carrier 24 is less than 20 inches.

This unique combination of power transmission, wheel jounce travel, overall axle width, and maximum carrier width is made possible by unique architectural features of the carrier 24. The carrier 24 is shown in greater detail in FIG. 3. The carrier 24 includes a carrier housing 40 with a rear opening 42 that opens into an internal cavity 44. A cover 46 is used to close the rear opening 42 once all carrier internal components have been installed. The cover 46 is secured to the carrier housing 40 with a plurality of fasteners 48.

Figure 3:
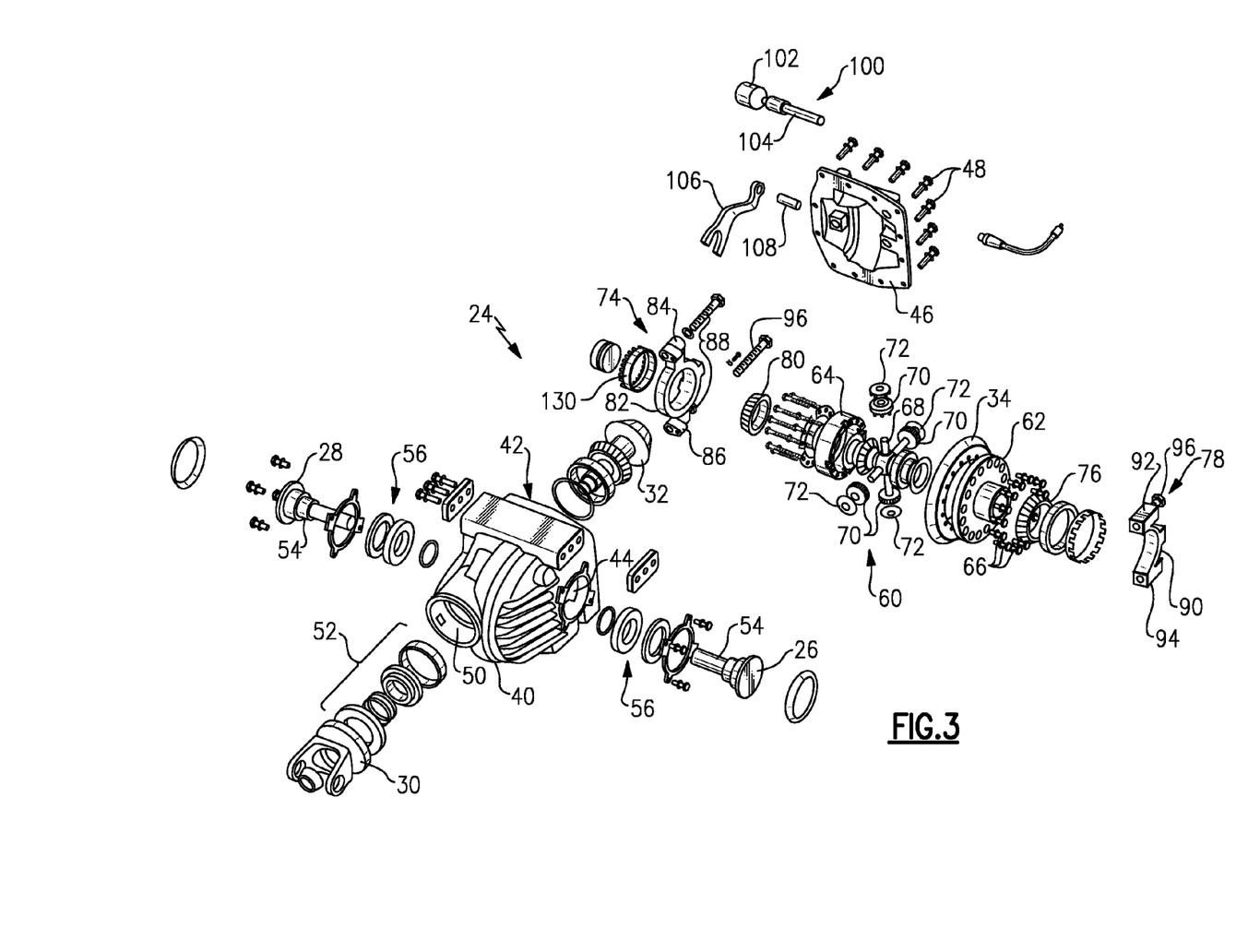
FIG. 3 shows an exploded view of the carrier.

The input yoke 30 is installed through a front opening 50 and includes a bearing 52 and associated components. The first 26 and second 28 driving outputs comprise shaft members 54 that are each supported by a shaft bearing 56. The shaft members 54 are connected to the wheel shafts 27 (FIG. 1) that drive the first 12 and second 14 wheel end assemblies with cardon joints as discussed above.

The pinion gear 32 is loaded into the carrier housing 40 from the rear through the rear opening 42. The ring gear 34 is pre-assembled to a differential 60 to form a differential and ring gear sub-assembly. This sub-assembly is also loaded into the carrier housing 40 from the rear through the rear opening 42.

The differential 60 includes a flange case half 62 and a plain case half 64. The ring gear 34 is secured to the flange case half 62 with a plurality of fasteners 66. The flange 62 and plain 64 case halves cooperate to support a differential spider 68 that has four leg portions. A differential spider gear 70 and thrust washer 72 are mounted on each leg portion. A first differential leg support 74 supports a differential bearing 76 for the flange case half 62 and the a second differential leg support 78 supports a differential bearing 80 for the plain case half 64. The differential leg supports are also sometimes referred to as "leg caps." When installed, the differential 60 and associated components are rotatable about an axis that extends in a lateral direction via the differential bearings 76, 80.

The first differential leg support 74 comprises a single piece circular mounting portion 82 with upper 84 and lower 86 mounting bosses that are secured to the carrier housing 40 with fasteners 88. The bolt-on leg configuration facilitates installation of the pinion gear 32 from the rear. The second differential leg support 78 includes a semi-circular mounting portion 90 with upper 92 and lower 94 mounting bosses to form a C-shaped component. Fasteners 96 secure the mounting bosses 92, 94 to the carrier housing 40. The mounting portion 82 of the first differential leg support 74 extends 360 degrees about the axis while the mounting portion 90 of the second differential leg support 78 does not extend 360 degrees about the axis. The benefits of this configuration will be discussed in greater detail below.

Also as shown in FIG. 3, a differential lock actuator 100 is installed on the cover 46 prior to the cover 46 being attached to the carrier housing 40. A piston 102, push rod 104, shift fork 106, and resilient spring member 108 cooperate to lock the differential 60 in a known manner. When locked, the driving outputs 26, 28 are fixed together for rotation at a common speed, and when unlocked, the driving outputs 26, 28 are allowed to rotate at different speeds from each other to allow the vehicle to perform cornering maneuvers, etc.

The location of the differential lock actuator 100 is unique and allows for a sub-assembly unit of the actuator onto the cover 46 prior to installing the cover 46 onto the carrier 24. This is shown in greater detail in FIG. 4. The differential lock actuator 100 includes a housing 110 that is integrally formed with the cover 46 as a single piece component. The piston 102 and push rod 104 are installed within the housing 110. By installing the differential lock actuator on the cover 42, the entire differential 60 can be easily installed within the carrier 24 without requiring further installation of differential lock components. Instead, the differential lock components are associated with the cover 46, which is installed onto the carrier 24 after the differential 60 has been installed. Further, by mounting the differential lock actuator 100 on the cover 46, a lower overall height of the carrier 24 is provided as well as a narrow width when compared to prior designs where the differential lock actuator is incorporated into the main carrier housing 40.

Figure 4:
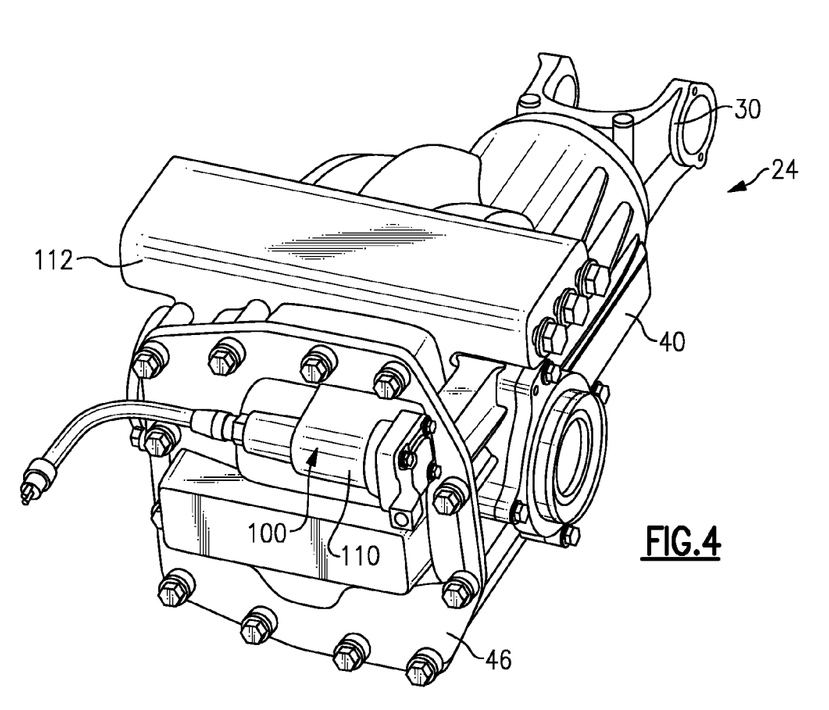
FIG. 4 shows a differential lock actuator installed within a cover of the carrier.

Further, as shown in FIG. 4, a structural cross member 112 is integrally formed with the carrier housing 40 as a single piece component. The structural cross member 112 comprises a laterally extending beam member that is bolted to the suspension sub-frame 20 to provide increased structural rigidity, i.e., this configuration allows for suspension load carrying by the carrier housing 40 in addition to providing a torque-reacting function.

Figure 5:
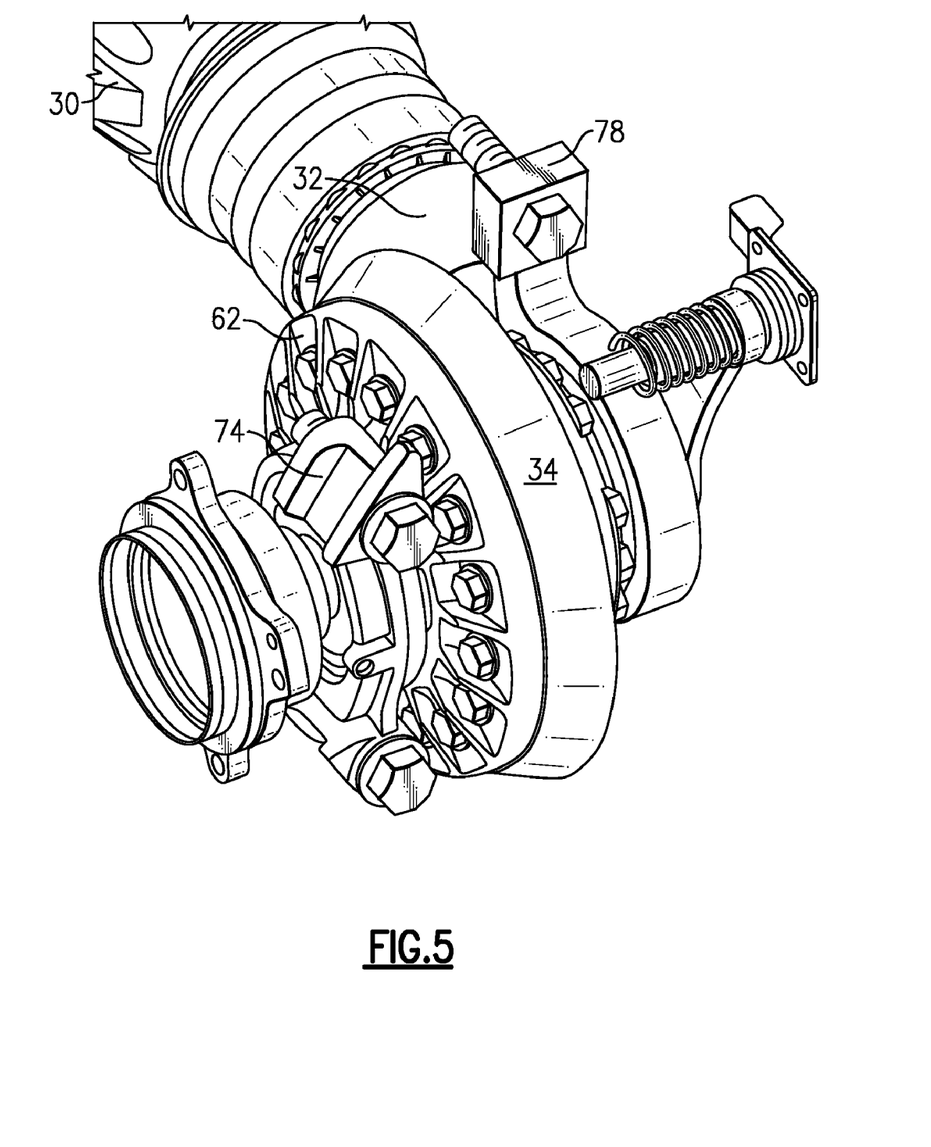
FIG. 5 shows a differential leg support installed within the carrier.

FIG. 5 shows the second differential support leg 78 in greater detail. The C-shaped leg makes for a very narrow arrangement of the components and does not interfere with assembly of the pinion gear 32. Thus, the open portion of the second differential support leg 78 provides a clearance such that the differential components can all be loaded from the rear through the rear opening. Additionally, a pinion cage is not required in this configuration which reduces the overall number of components and improves leakage reliability by eliminating a bolted joint.

Figure 6A:
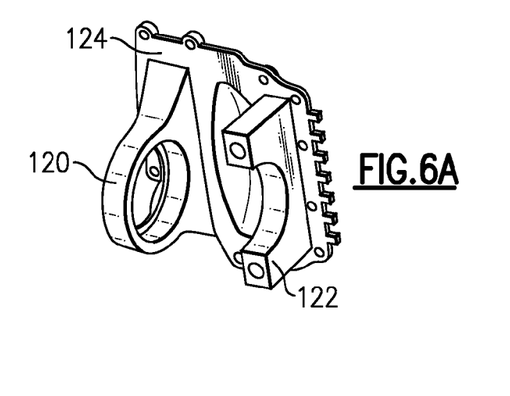
FIG. 6A shows a perspective view of an integrated cover and differential leg support.
Figure 6B:
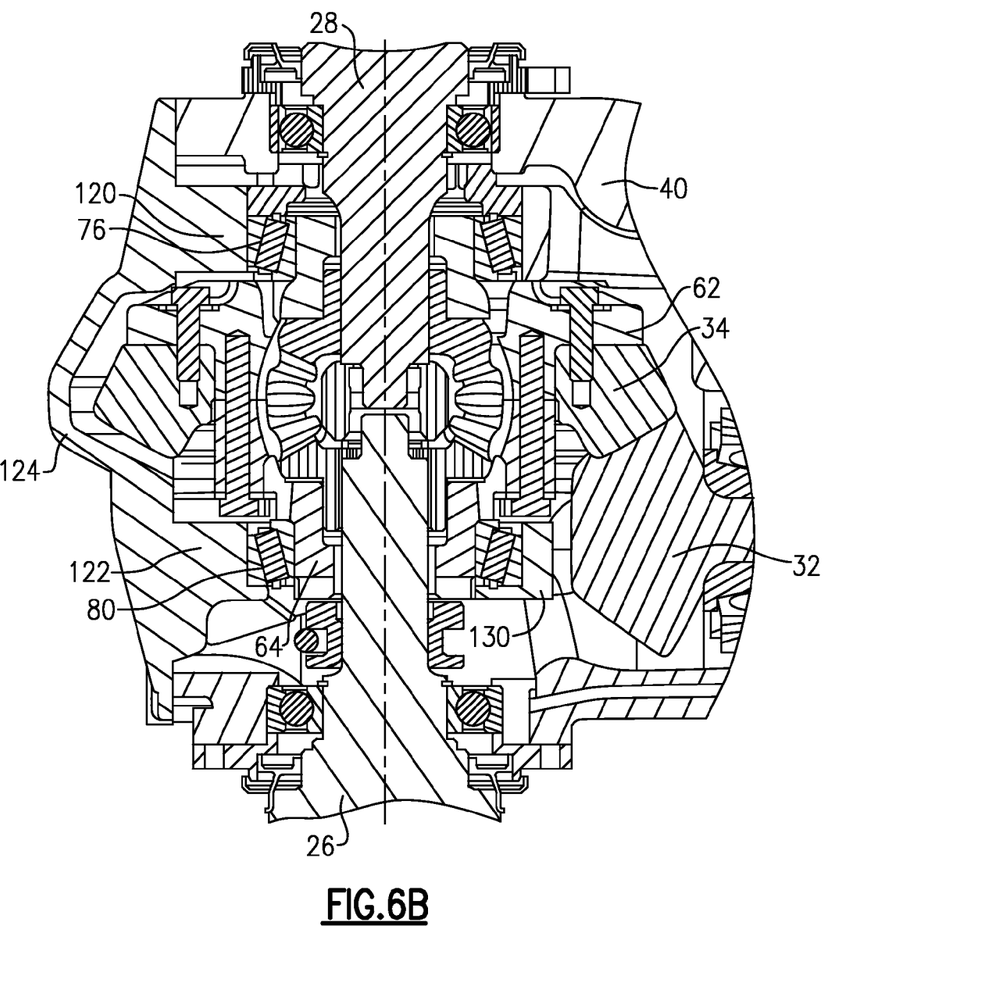
FIG. 6B shows a cross-sectional view of the integrated cover and differential leg support installed within a carrier.

FIGS. 6A and 6B show an alternate configuration where first 120 and second 122 differential support legs are integrally formed with a cover 124 as a single piece component. The first differential support leg 120 supports the differential bearing 76 at the flange case half 62, and the second differential support leg 122 supports the differential bearing 80 at the plain case half 64. While not shown, a differential lock actuator, similar to that shown in FIG. 4, could also be incorporated into the cover 124.

Threaded bearing cups 130 could be used in either configuration to allow preload to be easily adjusted without requiring separate adjusting rings.

Figure 7:
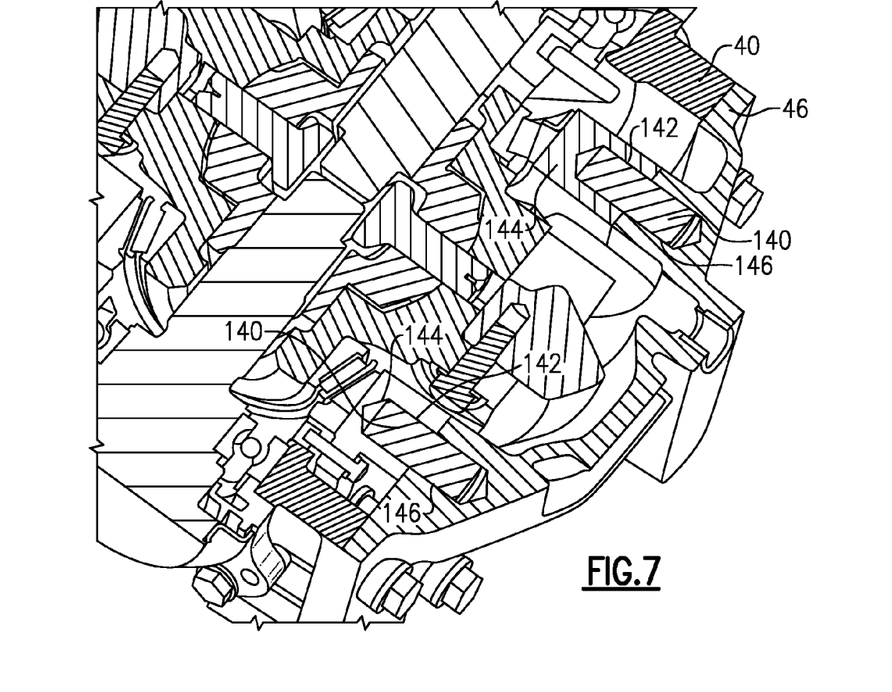
FIG. 7 shows a cross-sectional view of dowel pins in differential support legs used to align the cover with the carrier.

Another feature of the carrier 24 is shown in FIG. 7. Dowel pins 140 are pressed into bores 142 formed in differential leg structures 144 to provide a press-fit attachment. The cover 46 includes corresponding bores 146 that receive opposite ends of the dowel pins 140 in a clearance fit. Thus, the dowel pins 140 serve as a mechanism to easily align the cover 46 relative to the carrier housing 40 to provide precise assembly of the cover 46 onto the carrier housing 40. In addition to providing an alignment feature, the dowel pins 140 react the thrust loads that tend to separate the differential leg structures from each other.

A unique method for assembling the carrier is also provided due to the narrow architecture. As discussed above, the carrier is provided with a carrier housing having a rear opening 42 into an internal cavity and a cover for closing the rear opening. The pinion gear 32 is installed through the rear opening and into the internal cavity 44. Next, a differential and ring gear sub-assembly is installed through the rear opening 42 such that the pinion gear 32 meshes with a ring gear 34 of the differential and ring gear sub-assembly. Next, differential support leg structures are installed through the rear opening 42 to support the differential and ring gear sub-assembly. In the disclosed embodiment, the steps are performed sequentially.

Additional steps can include using dowel pins supported by the differential support legs to align the cover relative to the housing, using threaded bearing cups to support differential bearings and to allow for selective adjustment of bearing preloads, and installing a differential lock actuator on the cover prior to assembling the cover to the carrier housing.

Figure 8:
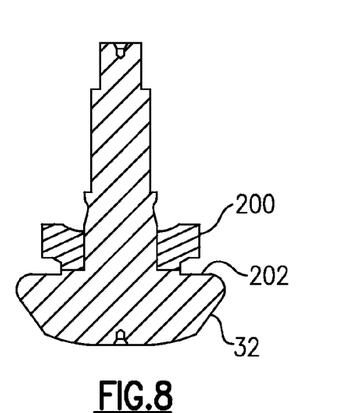
FIG. 8 shows a pinion gear and bearing assembly.
Figure 9:
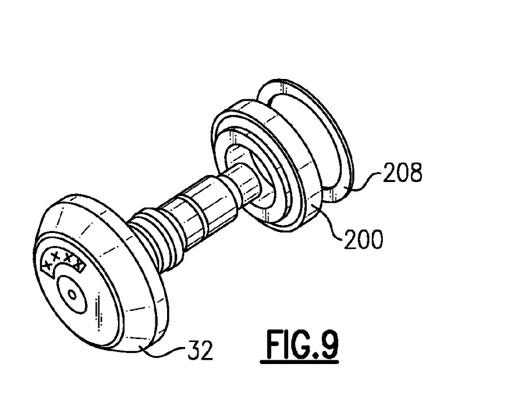
FIG. 9 shows the pinion gear and bearing assembly of FIG. 8 with a shim.

Further, the subject carrier provides for a method of setting pinion position for correct gear contact and setting the proper bearing preload. To provide proper gear contact, a matched ring/pinion set is selected and an inner pinion bearing cone for a pinion bearing 200 (FIG. 8) is pressed onto the pinion gear 32 such that the inner pinion bearing cone is fully seated against a shoulder 202. An inner pinion bearing cup that is to be used with the inner pinion bearing cone is positioned on bearing rollers. Next, an inner bearing thickness is measured with a suitable gage as indicated with dimension A. From a head of the pinion gear 32, an identifying mark, i.e., dimension B (FIG. 9), is read and recorded by a user. Dimension B is marked positive or negative and is a deviation of an actual test dimension A from a theoretical.

Figure 10:
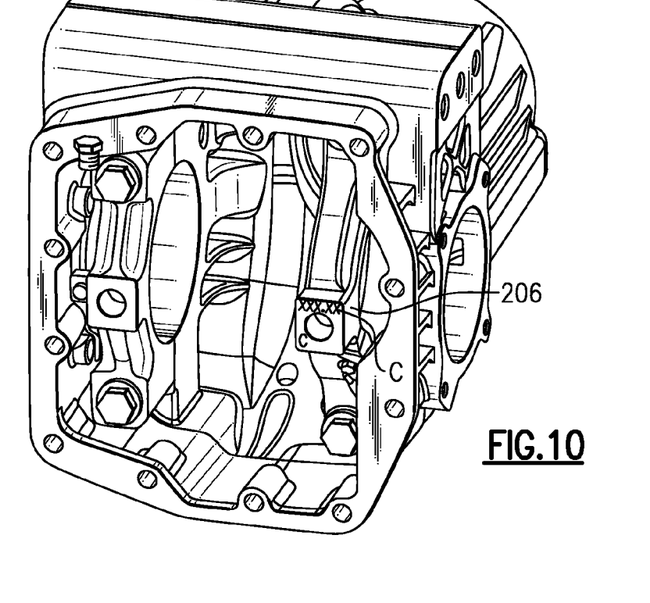
FIG. 10 shows a leg support structure in a differential housing with specified information used in conjunction with information from FIGS. 8 and 9 to determine shim size.

Next, as shown in FIG. 10, from a marking (identified as dimension C) on an end face of a bearing leg structure 206, a stamped measurement is read and recorded. A shim thickness S (FIG. 9) can then be determined by the following equation $S=C-(152.44+B)-A$. This equation includes a factor for the average bearing frown when the inner pinion bearing cup is fitted into a differential housing. For example, if $A=36.75$, $B=+0.03$, and $C=190.52$, then S will equal 1.30. Then a shim 208 measuring this total value is installed into the differential housing and is held in place by pressing into the inner pinion bearing cup, which is fully seated against the shim 208.

Setting bearing preload can be done using a dial indicator or by using a special gage. Each of these methods will be described below. When using a dial indicator, an outer pinion bearing cup of the pinion bearing 200 is pressed into an associated bore in the carrier housing 40 until the bearing cup is fully seated against an associated shoulder. Pinion bearing cones are lubricated with a proper lubricating fluid and are assembled to the pinion gear 32 as described above. Two large spacers (not shown) are installed onto the pinion gear 32, and the assembly is inserted into the carrier housing 40. An outer pinion bearing cone is then installed onto a shaft of the pinion gear with a suitable tool. A "dummy" yoke having loose splines is then stalled onto the shaft with a non-locking pinion nut that is tightened to a desired torque level, such as within a range of 1300-1700 Nm, for example. The pinion gear should be restrained from rotation such that pinion teeth are not damaged but the pinion gear should be able to rotate freely.

Next, a dial indicator is positioned on a pinion gear head such that axial endplay can be determined. The pinion gear is then rotated back and forth (left to right and then right to left) approximately +/−45 degrees in an oscillating motion under a minimum pushing force of 200 N force until a stable dial indicator reading can be taken. This indicates that bearing rollers are properly seated on an inner race and the pinion gear can no longer move inward. A maximum indicator reading is then recorded. The above steps are then repeated with a pulling motion instead of a pushing motion and another maximum indicator reading is recorded. A difference between these readings is determined and a preload value, such as 0.038 mm for example, is added to this difference to provide an initial value. The pinion nut, dummy yoke, and bearing are then disassembled and the two large spacers are removed.

Thicknesses of these spacers are then measured and the initial value determined above is subtracted from this measured thickness to provide a subsequent value. Two spacers are then selected that will yield this subsequent value. These spacers are then installed onto the bearing with the dummy yoke, etc. and the process discussed above is repeated. A torque wrench is then used to check the preload of the pinion bearing 200. If rotating torque is lower or higher than a desired Nm range, such as 2-5 Nm for example, then the thickness of the spacers is adjusted accordingly. Once satisfied, the nut and dummy yoke are removed and a pinion seal is installed along with a production yoke or companion flange and locking nut. The nut is then torqued to a desired torque value.

Figures 11A, 11B:
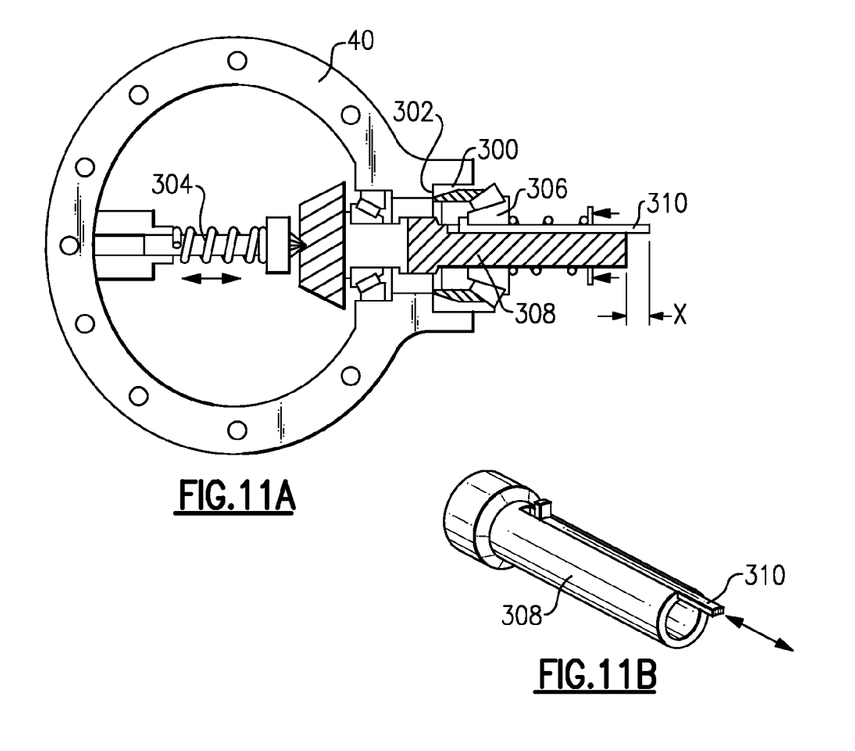
FIG. 11A shows a schematic representation of setting pinion bearing preload using a special gage.
FIG. 11B shows a perspective view of the gage including a sliding element.

When using a special gage to set the bearing preload, the following steps are performed. As shown in FIG. 11A, an outer pinion bearing cup 300 is installed within a bore in the carrier housing 40 until it is seated against a shoulder 302. Pinion bearing cones are properly lubricated and the pinion gear and inner bearing cone assembly are installed as described above. This assembly is held in position with a spring loaded tool 304 applying a minimum of 200 Nm against the pinion gear head. The pinion gear 32 is oscillated back and forth as described above to seat the inner pinion bearing rollers. The outer bearing 306 is assembled onto a gage 308, which is used to determine the correct bearing spacer thickness. Allowance must be made to produce 0.038 mm preload and to account for outer pinion bearing growth. The gage 308 includes a sliding element 310 (shown in FIG. 11B) that, when installed, extends outwardly from a distal end surface 312 of the gage 308 by a dimension X that is proportional to the spacer thickness. Spacers are then selected to achieve this measured thickness and are verified with a dummy yoke as described above.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A carrier assembly for a drive axle comprising:
a first output to drive a first wheel component;
a second output to drive a second wheel component;
a differential gear assembly coupled to said first and said second outputs to allow speed differentiation between said first and said second outputs;
a main carrier housing including an opening into an internal cavity that receives said differential gear assembly such that said main carrier housing substantially surrounds said differential gear assembly;
a carrier cover attachable to said main carrier housing to cover said opening and enclose said differential gear assembly within said main carrier housing; and a differential lock actuator located on said carrier cover to selectively lock said first and said second outputs to rotate at a common speed.

2. The carrier assembly according to claim 1 wherein said differential lock actuator includes an actuator housing that is integrally formed with said carrier cover as a single piece component.

3. The carrier assembly according to claim 2 wherein said differential lock actuator includes a shift fork supported by said carrier cover that is shiftable between a locked position and an unlocked position.

4. The carrier assembly according to claim 1 wherein said main carrier housing includes a structural cross member that is attachable to a sub-frame for an independent suspension.

5. The carrier assembly according to claim 4 wherein said first and said second outputs are rotatable about a lateral axis and wherein said structural cross member comprises a beam extending generally in a direction along said lateral axis, said beam being integrally formed with said main carrier housing as a single piece component.

6. The carrier assembly according to claim 4 wherein said carrier cover is bolted to said main carrier housing with a plurality of fasteners.

7. The carrier assembly according to claim 4 including a plurality of suspension control arms with each suspension control arm being connectable between said sub-frame and one of said first and said second wheel components.

8. A carrier assembly for a drive axle comprising:
an input pinion gear;
a ring gear driven by said input pinion gear;
a differential comprising a flange half differential case, a plain half differential case, and a differential gear assembly supported by said flange and plain half differential cases and receiving input from said ring gear to allow speed differentiation between first and second outputs;
a carrier housing including an internal cavity that receives said differential;
a differential bearing for rotatably supporting said differential for rotation relative to said carrier housing about an axis; and
a leg cap having a bearing portion for supporting said differential bearing and a mounting portion that is securable to said carrier housing with at least one fastener, said leg cap including a clearance area to allow said input pinion to assemble within said carrier housing.

9. The carrier assembly according to claim 8 wherein said differential bearing comprises a first differential bearing that rotatably supports said flange half differential case and a second differential bearing that rotatably support said plain half differential case, and wherein said leg cap supports said second differential bearing.

10. The carrier assembly according to claim 9 wherein said leg cap comprises a C-shape having a curved surface extending less than three-hundred and sixty degrees about the axis between a first end portion and a second end portion, and wherein said mounting portion comprises a first boss formed at said first end portion and a second boss formed at said second end portion, said first and said second bosses each receiving a fastener to secure said leg cap to said carrier housing.

11. The carrier assembly according to claim 10 including a second leg cap to support said first differential bearing, said second leg cap comprising a ring shape having a curved surface extending three-hundred and sixty degrees about the axis and a mounting portion including an upper boss formed on an outer circumference of said second leg cap and a lower boss formed on said outer circumference at a position opposite from said upper boss, said upper and said lower bosses each receiving a fastener to secure said second leg cap to said carrier housing.

12. A carrier assembly for a drive axle comprising:
a differential for driving first and second outputs;
at least one differential bearing that rotatably supports said differential;
a differential leg structure that supports said at least one differential bearing;
a main carrier housing including an opening into an internal cavity that receives said differential such that said main carrier housing substantially surrounds said differential;
a carrier cover attachable to said main carrier housing to cover said opening and enclose said differential gear assembly within said main carrier housing; and
at least one dowel pin that secures said carrier cover to said differential leg structure.

13. The carrier assembly according to claim 12 wherein said at least one dowel pin includes a press-fit interface between one end of said at least one dowel pin and said differential leg structure and a clearance-fit between an opposite end of said at least one dowel pin and said carrier cover.

14. The carrier assembly according to claim 12 wherein said at least one dowel pin comprises a locating feature to precisely align said carrier cover relative to said main carrier housing.

15. The carrier assembly according to claim 12 wherein said differential includes a flange half differential case, a plain half differential case, and a differential gear assembly supported by said flange and said plain half differential cases to allow speed differentiation between said first and second outputs, and wherein said at least one differential bearing comprises a first differential bearing to rotatably support said flange half differential case and a second differential bearing to rotatably support said plain half differential case, said differential leg structure comprises a first leg structure that supports said first differential bearing and a second leg structure that supports said second differential bearing, and wherein said at least one dowel pin comprises at least a first dowel pin that secures said carrier cover to said first leg structure and a second dowel pin that secures said carrier cover to said second leg structure.

16. The carrier assembly according to claim 15 wherein said differential rotates about a lateral axis and wherein said first leg structure includes a first bore to receive one end of said first dowel pin and said second leg structure includes a second bore to receive one end of said second dowel pin, said first and said second dowel pins reacting to thrust loads to prevent said first and said second leg structures from spreading apart from each other in a direction along said lateral axis.

17. An independent suspension and axle assembly comprising:
a drive axle having a first wheel component and a second wheel component laterally spaced apart from said first wheel component to define an overall axle width;
an independent suspension to independently support said first and said second wheel component from each other;
a carrier having a first output to drive said first wheel component and a second output to drive said second wheel component, said carrier being defined by a maximum carrier width, and wherein said first output is coupled to a first wheel shaft with a first driveline joint assembly and said second output is coupled to a second wheel shaft with a second driveline joint assembly and wherein said maximum carrier width is defined as a lateral width extending between centers of said first and said second driveline joint assemblies; and wherein said maximum carrier width is less than twenty-five percent of said overall axle width.

18. The independent suspension and axle assembly according to claim 17 wherein said maximum carrier width is approximately twenty percent or less of said overall axle width.

19. The independent suspension and axle assembly according to claim 17 wherein said overall axle width is less than 100 inches and said maximum carrier width is less than 20 inches.

20. The independent suspension and axle assembly according to claim 17 wherein said independent suspension includes first upper and lower control arms that couple said first wheel component to a suspension sub-frame and second upper and lower control arms that couple said second wheel component to said suspension sub-frame, said first upper and lower control arms and said second upper and lower control arms providing a minimum of 20 inches of jounce travel for said first and second wheel components.

21. The independent suspension and axle assembly according to claim 20 wherein said first upper and lower control arms and said second upper and lower control arms provide a jounce range of 20 to 24 inches of travel.

22. The independent suspension and axle assembly according to claim 17 wherein said carrier includes an input pinion gear that drives a ring gear and a differential that is coupled to said ring gear, said differential allowing speed differentiation between said first and said second wheels ends, and wherein said maximum carrier width is less than 20 inches with said ring gear having a diameter that is greater than 10.5 inches.

23. An independent suspension and axle assembly comprising:

a drive axle having a first wheel component and a second wheel component laterally spaced apart from said first wheel component;

an independent suspension to independently support said first and said second wheel components from each other, said independent suspension providing up to 24 inches of wheel jounce travel; and a carrier having a first output to drive said first wheel and a second output to drive said second wheel, wherein said first output is coupled with a first joint assembly to a first wheel shaft to drive said first wheel component and said second output is coupled with a second joint assembly to a second wheel shaft to drive said second wheel component, and wherein said carrier is defined by a maximum carrier width extending between centers of said first and second joint assemblies that is 500 millimeters or less.

24. A carrier assembly for a drive axle comprising:

a main carrier housing including an opening into an internal cavity;

a carrier cover attachable to said main carrier housing to cover said opening; and a differential for driving first and second outputs, said differential being mounted to said carrier cover to form a sub-assembly, wherein said sub-assembly is inserted into said internal cavity such that said main carrier housing substantially surrounds said differential with said carrier cover closing said opening, and wherein said differential comprises a flange half differential case supported by a first differential bearing, a plain half differential case supported by a second differential bearing, and a differential gear assembly supported by said flange and said plain half differential cases to allow speed differentiation between said first and second outputs, and including a first differential leg structure supporting said first differential bearing and a second differential leg structure supporting said second differential bearing, said first and said second differential leg structures being integrally formed with said carrier cover as a single piece component.

* * * * *